US012559073B2

(12) United States Patent
Xia

(10) Patent No.: US 12,559,073 B2
(45) Date of Patent: Feb. 24, 2026

(54) SELF-CALIBRATING WHEEL SPEED SIGNALS FOR ADJUSTING BRAKE AND CHASSIS CONTROLS

(71) Applicants: Hyundai Motor Company, Seoul (KR); Kia Corporation, Seoul (KR)

(72) Inventor: Yan Xia, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 240 days.

(21) Appl. No.: 18/197,179

(22) Filed: May 15, 2023

(65) Prior Publication Data

US 2024/0383457 A1 Nov. 21, 2024

(51) Int. Cl.
*B60T 8/1755* (2006.01)
*B60W 30/02* (2012.01)
*B60W 50/02* (2012.01)

(52) U.S. Cl.
CPC ......... *B60T 8/17551* (2013.01); *B60W 30/02* (2013.01); *B60W 50/0225* (2013.01); *B60T 2230/03* (2013.01); *B60T 2270/406* (2013.01); *B60T 2270/416* (2013.01); *B60W 2050/0215* (2013.01); *B60W 2510/0638* (2013.01); *B60W 2510/10* (2013.01); *B60W 2520/28* (2013.01); *B60W 2530/20* (2013.01); *B60Y 2400/3032* (2013.01)

(58) Field of Classification Search
CPC ............. B60T 8/17551; B60T 2230/03; B60T 2240/08; B60T 2270/40; B60T 2270/406; B60T 2270/416; B60W 30/02; B60W 30/04; B60W 2030/041; B60W 2030/043; B60W 2050/0215; B60W 2510/0215; B60W 2510/0638; B60W 2510/10; B60W 2520/28; B60W 2530/20; G01P 21/02; B60Y 2400/3032
See application file for complete search history.

(56) References Cited

U.S. PATENT DOCUMENTS

| | | | | |
|---|---|---|---|---|
| 5,299,131 | A | * | 3/1994 | Haas ....................... B60T 8/173 701/91 |
| 5,479,811 | A | * | 1/1996 | Baumann ................ B60T 8/172 73/1.37 |
| 5,490,070 | A | * | 2/1996 | Kiryu ..................... B60T 8/172 180/197 |

(Continued)

FOREIGN PATENT DOCUMENTS

| | | | | |
|---|---|---|---|---|
| FR | 3000930 A1 | * | 7/2014 | .......... B60T 8/17551 |
| JP | 2008213761 A | * | 9/2008 | |

*Primary Examiner* — John M Zaleskas
(74) *Attorney, Agent, or Firm* — Fox Rothschild LLP

(57) ABSTRACT

Systems and methods for self-calibrating wheel speed signals are provided. The method may comprise measuring, using one or more wheel speed sensors of a vehicle, a wheel speed for one or more wheels of the vehicle, detecting, using a detection module, an initial wheel speed error by comparing a measured wheel speed against a reference wheel speed, generating a wheel speed signal for each of the one or more wheels, calculating, using a recalibration module, a correction factor for each of the one or more wheels to apply to each wheel speed signal, and applying, for each of the one or more wheels, the correction factor to the wheel speed signal by multiplying each wheel speed by a corresponding correction factor.

9 Claims, 4 Drawing Sheets

(56)                 References Cited

U.S. PATENT DOCUMENTS

| | | | | |
|---|---|---|---|---|
| 5,682,333 | A | * | 10/1997 | Baumann ................ G01P 15/16 180/197 |
| 5,699,251 | A | * | 12/1997 | Mori .................... B60C 23/061 340/444 |
| 5,706,198 | A | * | 1/1998 | Schmitt ................... B60T 8/175 701/79 |
| 5,725,067 | A | * | 3/1998 | Ikeda ..................... B60T 8/172 180/197 |
| 5,760,682 | A | * | 6/1998 | Liu ...................... B60C 23/061 340/444 |
| 5,771,479 | A | * | 6/1998 | Yamamoto ............. B60T 8/172 701/92 |
| 5,802,491 | A | * | 9/1998 | Bush ...................... B60T 8/172 701/76 |
| 5,828,585 | A | | 10/1998 | Welk et al. |
| 5,852,788 | A | * | 12/1998 | Toyoda ................... G01P 21/02 701/79 |
| 5,929,329 | A | * | 7/1999 | Burkhard ................ G01P 21/02 73/146 |
| 5,995,897 | A | * | 11/1999 | Oshiro .................. B60T 8/1755 701/72 |
| 6,282,479 | B1 | * | 8/2001 | Ghoneim ............ B60T 8/17551 701/72 |
| 6,304,807 | B1 | * | 10/2001 | Kirchberger ............ B60T 8/172 701/72 |

| | | | | |
|---|---|---|---|---|
| 2002/0019717 | A1 | * | 2/2002 | Uchida ................... B60T 8/172 701/79 |
| 2002/0161504 | A1 | * | 10/2002 | Schmitt ................... B60T 8/173 701/70 |
| 2004/0167692 | A1 | * | 8/2004 | Lu ........................... B60T 8/172 280/5.502 |
| 2004/0172181 | A1 | * | 9/2004 | Lu ......................... B60C 23/061 340/442 |
| 2006/0255924 | A1 | * | 11/2006 | Ray ...................... B60C 23/061 340/444 |
| 2008/0272899 | A1 | * | 11/2008 | Penzotti ............. B60T 8/17554 701/1 |
| 2009/0306851 | A1 | * | 12/2009 | Joyce ..................... G01P 21/02 701/36 |
| 2009/0326733 | A1 | * | 12/2009 | Abele .................... G01P 21/02 701/1 |
| 2010/0114428 | A1 | * | 5/2010 | Kurata ............... G01M 17/013 701/36 |
| 2010/0145574 | A1 | * | 6/2010 | Mattson ............. B60T 8/17554 701/38 |
| 2016/0059859 | A1 | * | 3/2016 | Ye ................... B60W 30/18172 701/75 |
| 2016/0282226 | A1 | * | 9/2016 | Lavoie ................... B60C 99/00 |
| 2018/0236989 | A1 | * | 8/2018 | Lian ....................... B60T 8/172 |
| 2018/0265091 | A1 | * | 9/2018 | Ienaga ..................... B60K 1/02 |
| 2019/0152454 | A1 | * | 5/2019 | Watanabe ....... B60W 30/18145 |
| 2019/0226841 | A1 | * | 7/2019 | Johansson ............. G01B 21/32 |
| 2021/0261143 | A1 | * | 8/2021 | Lapis ............... B60W 50/0098 |

* cited by examiner

SELF-CALIBRATING WHEEL SPEED SIGNALS FOR ADJUSTING BRAKE AND CHASSIS CONTROLS

BACKGROUND

Technical Field

Embodiments of the present disclosure relate to systems and methods for self-calibrating wheel speed signals for adjusting brake controls and chassis controls of a vehicle.

Background

A common aftermarket modification in North America for trucks and off-road SUV's is the installation of non-original equipment manufacturer (OEM) tires. The use of these non-OEM tires creates an error in the vehicle's wheel speed signals. As a result, brake control and chassis control may not work properly, and speedometer measurements may be inaccurate. Even where wheel speed sensors are adjustable, a driver may not be aware or know how to make any necessary changes for a non-OEM tire. This creates a serious safety hazard due to the mismatch between actual tire size and brake and chassis control systems.

Non-OEM diameter tires which may be installed on a vehicle may comprise, but are not limited to, larger diameter off-road tires to improve off-road capabilities. These non-OEM tires may cause wheel speed signals to read lower than the actual wheel speed, and vehicle electronic stability control (ESC) may be less effective in preventing a likelihood of rollover.

SUMMARY

According to an object of the present disclosure, a method for self-calibrating wheel speed signals is provided.

In one aspect, the method may comprise: a) measuring, using one or more wheel speed sensors of a vehicle, a wheel speed for one or more wheels of the vehicle; b) detecting, using a detection module, an initial wheel speed error by comparing a measured wheel speed against a reference wheel speed; c) generating a wheel speed signal for each of the one or more wheels, calculating, using a recalibration module, a correction factor for each of the one or more wheels to apply to each wheel speed signal; and d) applying, for each of the one or more wheels, the correction factor to the wheel speed signal by multiplying each wheel speed by a corresponding correction factor.

According to an exemplary embodiment, the reference wheel speed may be based on a predetermined table based on one or more of the following. RPM of an engine of the vehicle, transmission gear of the vehicle; and a factory-sized tire diameter.

According to an exemplary embodiment, the detecting the initial wheel speed error may comprise determining whether the initial wheel speed error is greater than a wheel speed error threshold.

According to an exemplary embodiment, the method may further comprise, when the initial wheel speed error is not greater than the wheel speed error threshold, setting the detection module in a standby mode.

According to an exemplary embodiment, the correction factor, for each wheel, may be equal to the reference wheel speed divided by the measured wheel speed.

According to an exemplary embodiment, the method may further comprise determining, using an electronic stability control (ESC) rollover module, whether the correction factor is large enough to prevent a rollover due to an increased center of gravity (CG) height.

According to an exemplary embodiment, the method may further comprise, when the correction factor is large enough to prevent a rollover due to an increased CG height, modifying, using the ESC rollover module, an ESC rollover control threshold.

According to an object of the present disclosure, a system for self-calibrating wheel speed signals is provided. The system may comprise a vehicle, comprising one or more wheels, one or more wheel speed sensors configured to measure a wheel speed for each of the one or more wheels, and a processor, configured to detect, using a detection module, an initial wheel speed error by comparing a measured wheel speed against a reference wheel speed, generating a wheel speed signal for each of the one or more wheels, calculate, using a recalibration module, a correction factor for each of the one or more wheels to apply to each wheel speed signal, and apply, for each of the one or more wheels, the correction factor to the wheel speed signal by multiplying each wheel speed by a corresponding correction factor.

According to an exemplary embodiment, the reference wheel speed may be based on a predetermined table based on one or more of the following RPM of an engine of the vehicle; transmission gear of the vehicle; and a factory-sized tire diameter.

According to an exemplary embodiment, the detecting the initial wheel speed error may comprise determining whether the initial wheel speed error is greater than a wheel speed error threshold.

According to an exemplary embodiment, the processor may be further configured to, when the initial wheel speed error is not greater than the wheel speed error threshold, set the detection module in a standby mode.

According to an exemplary embodiment, the correction factor, for each wheel, may be equal to the reference wheel speed divided by the measured wheel speed.

According to an exemplary embodiment, the processor may be further configured to determine, using an ESC rollover module, whether the correction factor is large enough to prevent a rollover due to an increased CG height.

According to an exemplary embodiment, the processor may be further configured to, when the correction factor is large enough to prevent a rollover due to an increased CG height, modify, using the ESC rollover module, an ESC rollover control threshold.

According to an object of the present disclosure, a system for self-calibrating wheel speed signals is provided. The system may comprise a vehicle, comprising one or more wheels and one or more wheel speed sensors configured to measure a wheel speed for each of the one or more wheels. The system may further comprise a computing device, comprising a processor and a memory, configured to store programming instructions. The programming instructions, when executed by the processor, may cause the processor to detect, using a detection module, an initial wheel speed error by comparing a measured wheel speed against a reference wheel speed, generating a wheel speed signal for each of the one or more wheels, calculate, using a recalibration module, a correction factor for each of the one or more wheels to apply to each wheel speed signal, and apply, for each of the one or more wheels, the correction factor to the wheel speed signal by multiplying each wheel speed by a corresponding correction factor.

According to an exemplary embodiment, the reference wheel speed may be based on a predetermined table based on one or more of the following RPM of an engine of the vehicle; transmission gear of the vehicle; and a factory-sized tire diameter.

According to an exemplary embodiment, the detecting the initial wheel speed error may comprise determining whether the initial wheel speed error is greater than a wheel speed error threshold, and the programming instructions, when executed by the processor, may be further configured to cause the processor to, when the initial wheel speed error is not greater than the wheel speed error threshold, set the detection module in a standby mode.

According to an exemplary embodiment, the correction factor, for each wheel, may be equal to the reference wheel speed divided by the measured wheel speed.

According to an exemplary embodiment, the programming instructions, when executed by the processor, may be further configured to cause the processor to determine, using an ESC rollover module, whether the correction factor is large enough to prevent a rollover due to an increased CG height.

According to an exemplary embodiment, the programming instructions, when executed by the processor, may be further configured to cause the processor to, when the correction factor is large enough to prevent a rollover due to an increased CG height, modify, using the ESC rollover module, an ESC rollover control threshold.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
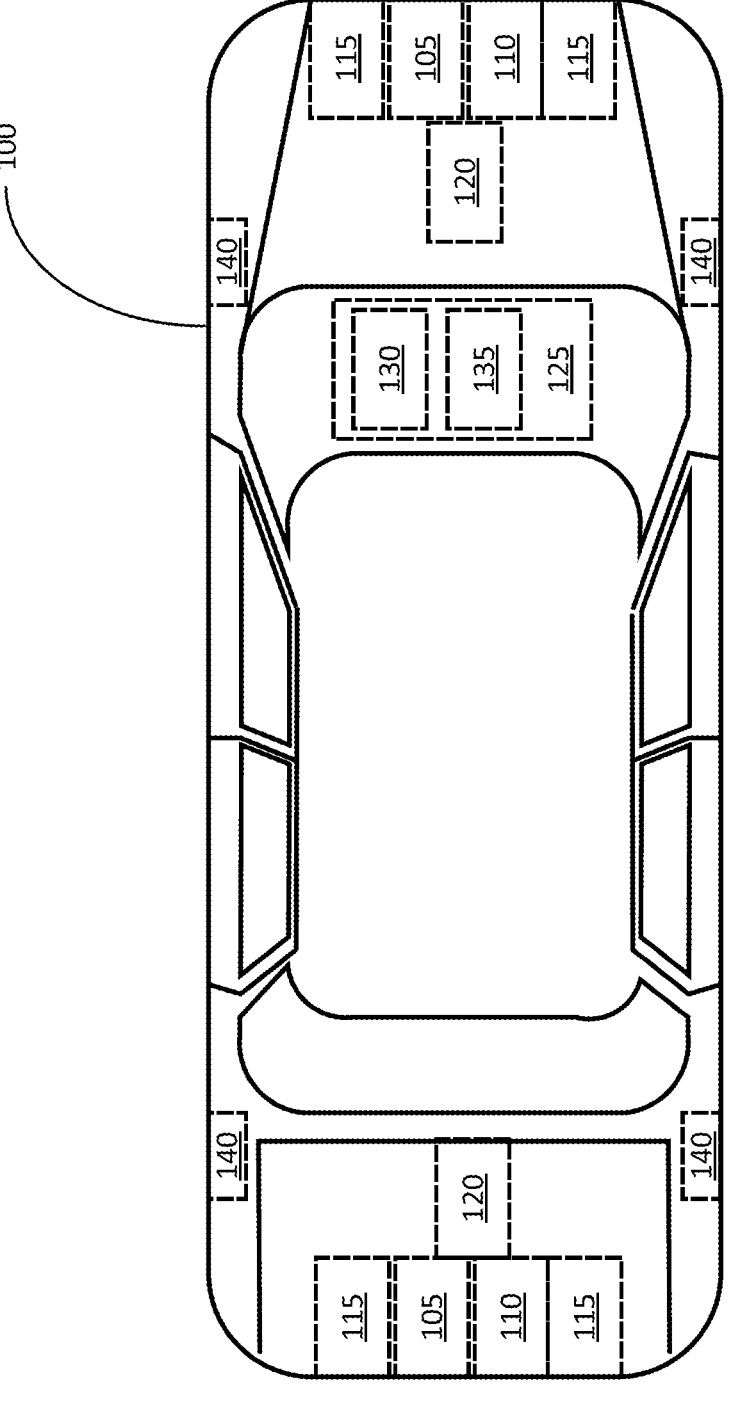
FIG. 1 illustrates a vehicle configured to self-calibrate wheel speed signals, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software.

To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors, single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to an exemplary embodiment, the present disclosure provides systems and methods which provide a logic to self-calibrate individual wheel speed signals to ensure proper function of speedometers and other safety-related functions such as, e.g., brake and chassis controls. According to an exemplary embodiment, the logic may be configured to recognize highway driving conditions based on driver and vehicle parameters.

A constant traction control system (TCS) slip ratio to engine revolutions per minute (RPM) may be detected due to a tire diameter difference According to an exemplary embodiment, the logic may correct this error by applying a scale factor on an individual wheel speed signal until a constant slip ratio is in an acceptable range According to an exemplary embodiment, if a correction factor is large, an additional electronic stability control (ESC) parameter may be modified to ensure rollover prevention due to an increased center of gravity (CG) height.

Referring now to FIG. 1, a vehicle 100 configured to self-calibrate wheel speed signals is illustratively depicted, in accordance with an exemplary embodiment of the present disclosure.

According to an exemplary embodiment, the vehicle 100 may comprise one or more sensors such as, for example, one or more LiDAR sensors 105, one or more radio detection and ranging (RADAR) sensors 110, one or more cameras 115, and/or one or more position determining sensors 120 (e.g., one or more Global Positioning System devices), among other suitable sensors. According to an exemplary embodiment, the one or more sensors may be in electronic communication with one or more computing devices 125. The one or more computing devices 125 may be separate from the one or more sensors and/or may be incorporated into the one or more sensors.

According to an exemplary embodiment, the computing device 125 may comprise a processor 130 and/or a memory 135. The memory 135 may be configured to store programming instructions that, when executed by the processor 130, may be configured to cause the processor 130 to perform one or more tasks such as, e.g., receiving one or more inputs from one or more sensors (e.g., receiving one or more wheel speeds for one or more wheels of the vehicle 100 from one or more wheel speed sensors 140), detecting an initial wheel speed error under normal highway conditions, using a signal from the transmission and engine RPM to determine a correction value to apply to a wheel speed signal, using information from an ESC rollover module and modifying an ESC activation threshold if changes are large enough to prevent rollover due to increased CG height, applying a final decision to the wheel speed offset and the ESC threshold modification, determining one or more vehicle actions, and/or performing one or more vehicle actions, among other functions.

According to an exemplary embodiment, the memory 135 may be configured to store a smart BEV range estimation algorithm which may be executed by the processor 130. The smart BEV range estimation algorithm may comprise an ADAS and map info processing model.

According to an exemplary embodiment, the smart BEV range estimation algorithm, when executed by the processor 130, may be configured to cause the vehicle 100 to perform one or more vehicle actions such as, e.g., updating the BEV range estimation, displaying the updated BEV range estimation, and/or one or more other vehicle actions. According to an exemplary embodiment, the one or more conditions may comprise, e.g., the presence of wind, the presence of one or more road and/or terrain conditions, the presence of one or more weather phenomena (e.g., rain, snow, sleet, hail, etc.), the speed of the BEV, whether the BEV is climbing or descending hills, whether the BEV is towing an object and/or the mass of the object being towed by the BEV, and and/or other suitable conditions.

Figure 2:
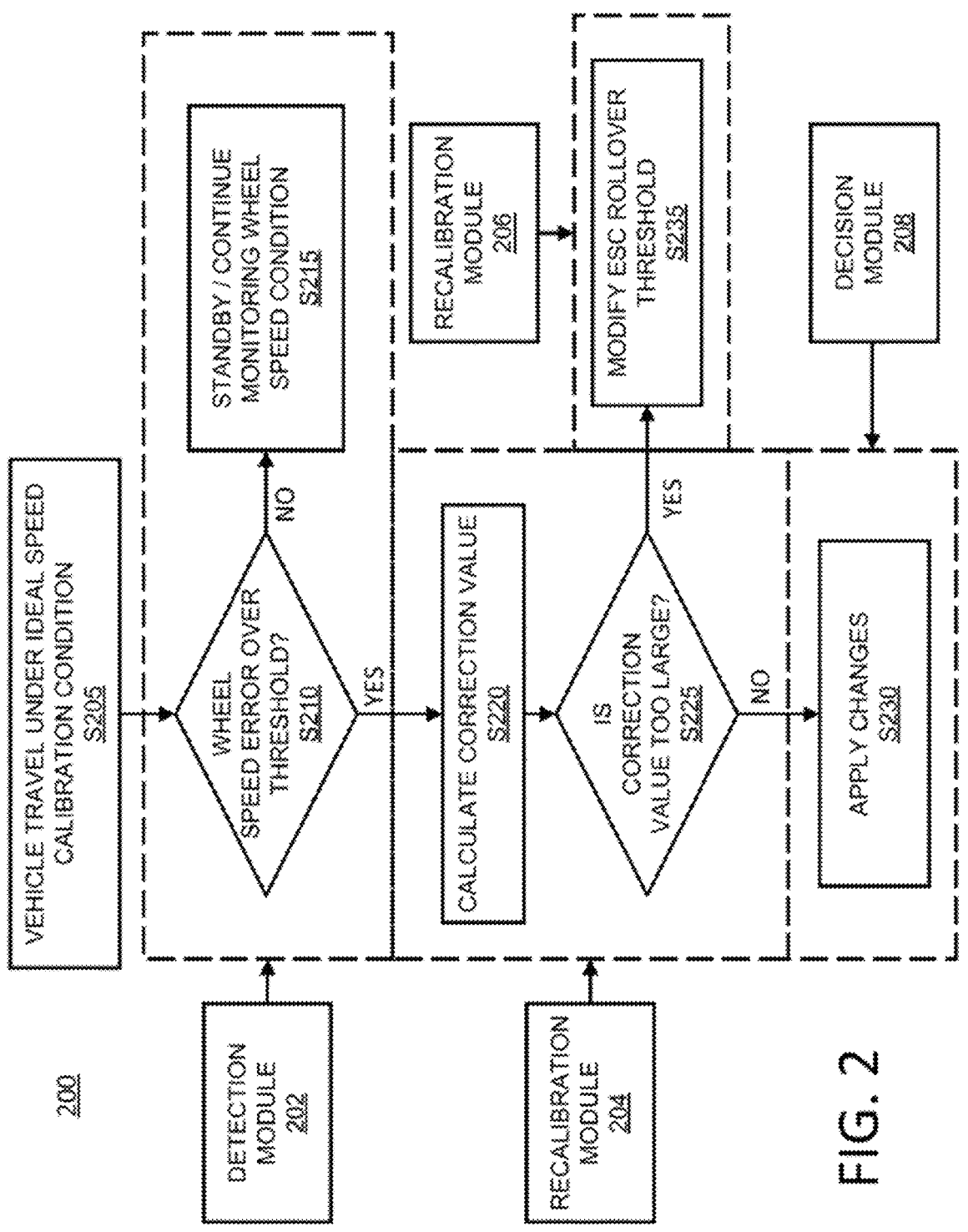
FIG. 2 illustrates a block flow diagram of a system for self-calibrating wheel speed signals, according to an exemplary embodiment of the present disclosure.

Referring now to FIG. 2, a block flow diagram of a system 200 for self-calibrating wheel speed signals is illustratively depicted, according to an exemplary embodiment of the present disclosure.

The system 200 may comprise a detection module 202, a recalibration module 204, an ESC rollover module 206, and a decision module 208. According to an exemplary embodiment, the system 200 may be a component of and/or in electronic communication with a computing device such as, e.g., computing device 125 of FIG. 1.

According to an exemplary embodiment, the detection module 202 may be configured to detect an initial wheel speed error under normal highway conditions, the recalibration module 204 may be configured to, once a constant error is detected, use a signal from the transmission and engine RPM to determine a correction value to apply to a wheel speed signal, the ESC rollover module 206 may be configured to use information from the ESC rollover module 204 and modify an ESC activation threshold if the changes are large enough to prevent rollover due to increased CG height, and the decision module 208 may be configured to apply a final decision to the wheel speed offset and the ESC threshold modification.

At S205, a vehicle may travel under ideal speed calibration conditions. According to an exemplary embodiment, the detection module 202 may be configured to determine whether a vehicle's wheel speed is incorrect by comparing a measured wheel speed with a reference speed, $V_{ref}$, under the ideal speed calibration conditions. According to an exemplary embodiment, $V_{ref}$ is a predetermined table based on engine RPM, transmission gear, and factory sized tire diameter.

An ideal speed calibration condition may occur, e.g., when a vehicle is driving according to a predefined set of ideal conditions (e.g., minimal direction deviations, minimal speed deviations, etc.). For example, an ideal speed calibration condition may comprise a vehicle driving straight on a highway with minimal speed deviations with a vehicle speed of 100 kph and above, a steering angle of less than 20 degrees, a steering velocity of less than 20 degrees per second, an accelerator position sensor (APS) input deviation of less than 10% within 20 seconds, a wheel speed error threshold of approximately 6% from $V_{ref}$ and a frequency of one calibration cycle per ignition cycle. It is noted, however, that other ideal conditions and/or values may be implemented while maintaining the spirit and functionality of the present disclosure.

At S210, the detection module 202 determines whether a wheel speed error is over a wheel speed error threshold from the $V_{ref}$. When the wheel speed error is not over the wheel speed error threshold from the $V_{ref}$, the detection module 202, at S215, may be placed on standby until a subsequent ignition cycle and/or may continue monitoring wheel speed conditions.

According to an exemplary embodiment, when the wheel speed error is over the wheel speed error threshold from the $V_{ref}$, the recalibration module 204 may determine a correct scale factor to apply to an individual wheel speed signal. At S220, the recalibration module 204 may calculate an individual wheel's correction factor, K, based on a TCS slip ratio percentage, according to Equation 1.

$$K = \frac{V_{ref}}{V_{measured\ FL,FR,RL,RR}} \qquad \text{Equation 1}$$

where FL is the front left wheel, FR is the front right wheel, RL is the rear left wheel, and RR is the rear right wheel of the vehicle.

According to an exemplary embodiment, the correction factor, K, may be multiplied to its corresponding wheel speeds. According to an exemplary embodiment, to avoid sudden performance changes, a maximum correction factor (and slew rate) may be set per ignition cycle. At S225, the recalibration module 204 determines if the correction value, K, is too large, i.e., if the correction value, K, is large enough to prevent rollover due to increased CG height.

When the correction value, K, is not too large, then, at S230, the changes may be applied to the new tire diameter.

When the correction value, K, is too large, then, at S235, the ESC rollover module 206 modifies an ESC rollover control threshold for an appropriate condition, and then, at S230, the changes may be applied to the new tire diameter.

Figure 3:
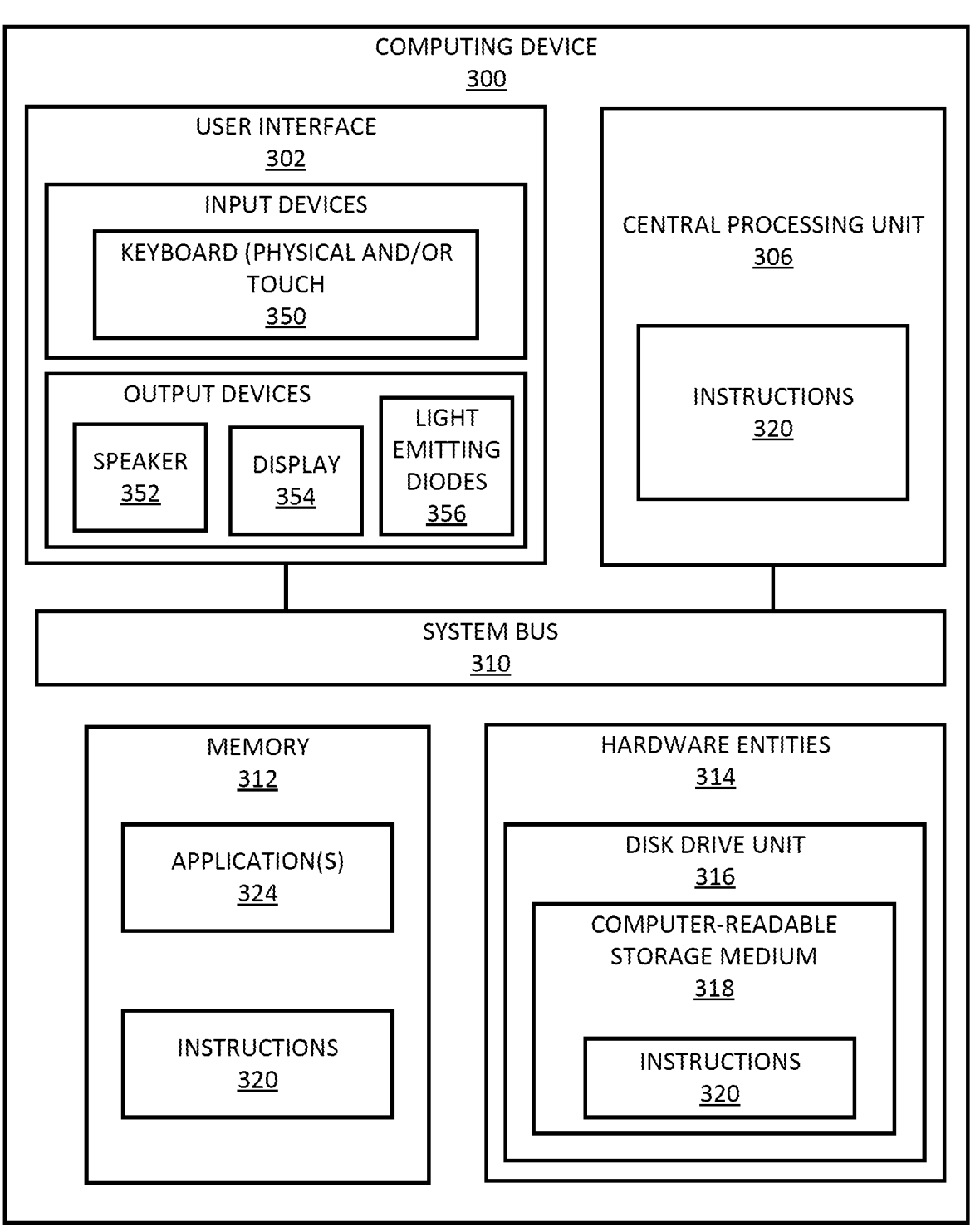
FIG. 3 illustrates example elements of a computing device, according to an exemplary embodiment of the present disclosure.

Referring now to FIG. 3, an illustration of an example architecture for a computing device 300 is provided. According to an exemplary embodiment, one or more functions of the present disclosure may be implemented by a computing device such as, e.g., computing device 300 or a computing device similar to computing device 300.

The hardware architecture of FIG. 3 represents one example implementation of a representative computing device configured to perform one or more methods and means for automatically applying braking during downhill motion and performing regenerative braking, as described herein. As such, the computing device 300 of FIG. 3 may be configured to implement at least a portion of the method(s) described herein and/or implement at least a portion of the functions of the system(s) described herein (e.g., vehicle 100 of FIG. 1 and system 200 of FIG. 2).

Some or all components of the computing device 300 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 3, the computing device 300 may comprise a user interface 302, a Central Processing Unit ("CPU") 306, a system bus 310, a memory 312 connected to and accessible by other portions of computing device 300 through system bus 310, and hardware entities 314 connected to system bus 310. The user interface may comprise input devices and output devices, which may be configured to facilitate user-software interactions for controlling operations of the computing device 300. The input devices may comprise, but are not limited to, a physical and/or touch keyboard 340. The input devices may be connected to the computing device 300 via a wired or wireless connection (e.g., a Bluetooth® connection). The output devices may comprise, but are not limited to, a speaker 342, a display 344, and/or light emitting diodes 346.

At least some of the hardware entities 314 may be configured to perform actions involving access to and use of memory 312, which may be a Random Access Memory (RAM), a disk driver and/or a Compact Disc Read Only Memory (CD-ROM), among other suitable memory types. Hardware entities 314 may comprise a disk drive unit 316 comprising a computer-readable storage medium 318 on which may be stored one or more sets of instructions 320 (e.g., programming instructions such as, but not limited to, software code) configured to implement one or more of the methodologies, procedures, or functions described herein. The instructions 320 may also reside, completely or at least partially, within the memory 312 and/or within the CPU 306 during execution thereof by the computing device 300.

The memory 312 and the CPU 306 may also constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
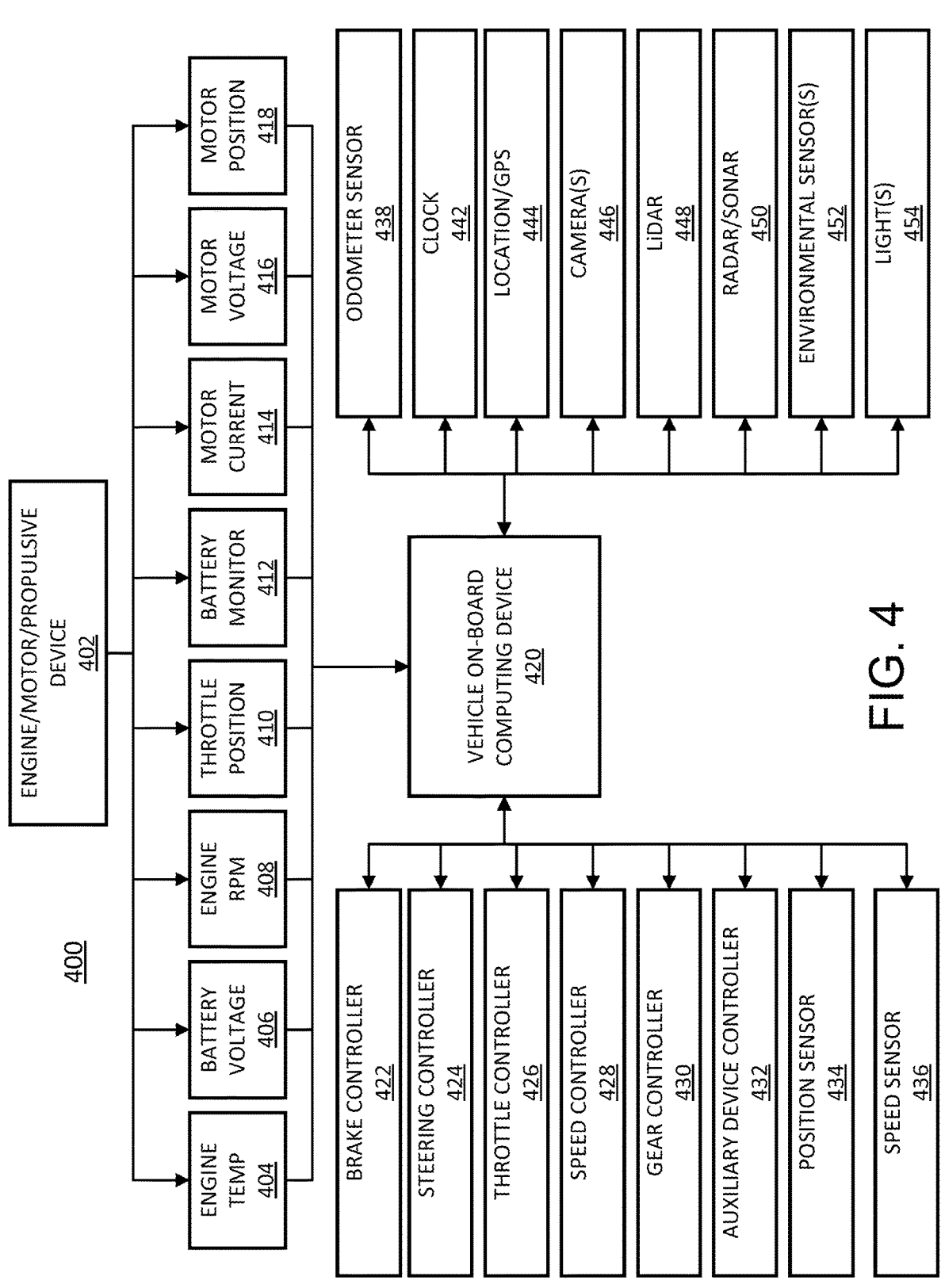
FIG. 4 illustrates an example architecture of a vehicle, according to an exemplary embodiment of the present disclosure.

Referring now to FIG. 4, an example vehicle system architecture 400 for a vehicle is provided, in accordance with an exemplary embodiment of the present disclosure.

Vehicle 100 may be configured to be incorporated in or with a vehicle having the same or similar system architecture as that shown in FIG. 4. Thus, the following discussion of vehicle system architecture 400 is sufficient for understanding one or more components of vehicle 100.

As shown in FIG. 4, the vehicle system architecture 400 may comprise an engine, motor or propulsive device (e.g., a thruster) 402 and various sensors 404-418 for measuring various parameters of the vehicle system architecture 400. In gas-powered or hybrid vehicles having a fuel-powered engine, the sensors 404-418 may comprise, for example, an engine temperature sensor 404, a battery voltage sensor 406, an engine revolutions per minute (RPM) sensor 408, and/or a throttle position sensor 410. If the vehicle is an electric or hybrid vehicle, then the vehicle may comprise an electric motor, and accordingly may comprise sensors such as a battery monitoring system 412 (to measure current, voltage and/or temperature of the battery), motor current 414 and voltage 416 sensors, and motor position sensors such as resolvers and encoders 418.

Operational parameter sensors that are common to both types of vehicles may comprise, for example a position sensor 434 such as an accelerometer, gyroscope and/or inertial measurement unit; a speed sensor 436; and/or an odometer sensor 438. The vehicle system architecture 400 also may comprise a clock 442 that the system uses to determine vehicle time and/or date during operation. The clock 442 may be encoded into the vehicle on-board computing device 420, it may be a separate device, or multiple clocks may be available.

The vehicle system architecture 400 also may comprise various sensors that operate to gather information about the environment in which the vehicle is traveling. These sensors may comprise, for example: a location sensor 444 (for example, a Global Positioning System (GPS) device); object detection sensors such as one or more cameras 446; a LIDAR sensor system 448; and/or a RADAR and/or a sonar system 450. The sensors also may comprise environmental sensors 452 such as, e.g., a humidity sensor, a precipitation sensor, a light sensor, and/or ambient temperature sensor. The object detection sensors may be configured to enable the vehicle system architecture 400 to detect objects that are within a given distance range of the vehicle in any direction, while the environmental sensors 452 may be configured to collect data about environmental conditions within the vehicle's area of travel. According to an exemplary embodiment, the vehicle system architecture 400 may comprise one or more lights 454 (e.g., headlights, flood lights, flashlights, etc.).

During operations, information may be communicated from the sensors to an on-board computing device 420 (e.g., computing device 300 of FIG. 3) The on-board computing device 420 may be configured to analyze the data captured by the sensors and/or data received from data providers and may be configured to optionally control operations of the vehicle system architecture 400 based on results of the analysis. For example, the on-board computing device 420 may be configured to control: braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions), and/or other controllers. The brake controller 422 may comprise a pedal effort sensor, pedal effort sensor, and/or simulator temperature sensor, as described herein.

Geographic location information may be communicated from the location sensor 444 to the on-board computing device 420, which may then access a map of the environment that corresponds to the location information to determine known fixed features of the environment such as streets, buildings, stop signs and/or stop/go signals. Captured images from the cameras 446 and/or object detection information captured from sensors such as LiDAR 448 may be communicated from those sensors to the on-board computing device 420. The object detection information and/or captured images may be processed by the on-board computing device 420 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for self-calibrating wheel speed signals, comprising:

measuring, using one or more wheel speed sensors of a vehicle, a wheel speed for one or more wheels of the vehicle;

detecting, using a detection module, an initial wheel speed error by comparing a measured wheel speed against a reference wheel speed;

generating a wheel speed signal for each of the one or more wheels;

determining, using the detection module, that the initial wheel speed error is greater than a wheel speed error threshold;

in response to determining that the initial wheel speed error is greater than the wheel speed error threshold, calculating, using a recalibration module, a correction factor for each of the one or more wheels to apply to each wheel speed signal;

determining, using an electronic stability control (ESC) rollover module, that the correction factor is large enough to prevent a rollover due to an increased center of gravity (CG) height; and in response to determining the correction factor is large enough to prevent the rollover due to the increased CG height, modifying, using the ESC rollover module, an ESC rollover control threshold.

2. The method of claim 1, wherein the reference wheel speed is based on a predetermined table based on one or more of the following:

RPM of an engine of the vehicle;

transmission gear of the vehicle; and a factory-sized tire diameter.

3. The method of claim 1, wherein the correction factor, for each wheel, is equal to the reference wheel speed divided by the measured wheel speed.

4. A system for self-calibrating wheel speed signals, comprising:

a vehicle, comprising:

one or more wheels;

one or more wheel speed sensors configured to measure a wheel speed for each of the one or more wheels; and a processor, configured to:

detect, using a detection module, an initial wheel speed error by comparing a measured wheel speed against a reference wheel speed;

generate a wheel speed signal for each of the one or more wheels;

determine, using the detection module, whether the initial wheel speed error is greater than a wheel speed error threshold;

in response to determining that the initial wheel speed error is not greater than the wheel speed error threshold, set the detection module in a standby mode;

in response to determining that the initial wheel speed error is greater than the wheel speed error threshold, calculate, using a recalibration module, a correction factor for each of the one or more wheels to apply to each wheel speed signal;

determine, using an electronic stability control (ESC) rollover module, whether the correction factor is large enough to prevent a rollover due to an increased center of gravity (CG) height;

in response to determining that the correction factor is not large enough to prevent the rollover due to the increased CG height, apply, for each of the one or more wheels, the correction factor to the wheel speed signal by multiplying each wheel speed by the corresponding correction factor; and in response to determining that the correction factor is large enough to prevent the rollover due to the increased CG height, modify, using the ESC rollover module, an ESC rollover control threshold.

5. The system of claim 4, wherein the reference wheel speed is based on a predetermined table based on one or more of the following:

RPM of an engine of the vehicle;

transmission gear of the vehicle; and a factory-sized tire diameter.

6. The system of claim 4, wherein the correction factor, for each wheel, is equal to the reference wheel speed divided by the measured wheel speed.

7. A system for self-calibrating wheel speed signals, comprising:

a vehicle, comprising:

one or more wheels; and one or more wheel speed sensors configured to measure a wheel speed for each of the one or more wheels; and a computing device, comprising a processor and a memory, configured to store programming instructions that, when executed by the processor, cause the processor to:

detect, using a detection module, an initial wheel speed error by comparing a measured wheel speed against a reference wheel speed;

generate a wheel speed signal for each of the one or more wheels;

determine whether the initial wheel speed error is greater than a wheel speed error threshold;

in response to determining the initial wheel speed error is not greater than the wheel speed error threshold, set the detection module in a standby mode;

in response to determining that the initial wheel speed error is greater than the wheel speed error threshold, calculate, using a recalibration module, a correction factor for each of the one or more wheels to apply to each wheel speed signal;

determine, using an electronic stability control (ESC) rollover module, whether the correction factor is large enough to prevent a rollover due to an increased center of gravity (CG) height;

in response to determining that the correction factor is not large enough to prevent the rollover due to the increased CG height, apply, for each of the one or more wheels, the correction factor to the wheel speed signal by multiplying each wheel speed by a corresponding correction factor; and in response to determining that the correction factor is large enough to prevent the rollover due to the increased CG height, modify, using the ESC rollover module, an ESC rollover control threshold.

8. The system of claim 7, wherein the reference wheel speed is based on a predetermined table based on one or more of the following:

RPM of an engine of the vehicle;

transmission gear of the vehicle; and a factory-sized tire diameter.

9. The system of claim 7, wherein the correction factor, for each wheel, is equal to the reference wheel speed divided by the measured wheel speed.

* * * * *